United States Patent
Boudville

(10) Patent No.: US 8,348,149 B1
(45) Date of Patent: Jan. 8, 2013

(54) USING DYNAMIC BARCODES TO SEND DATA TO A CELLPHONE

(75) Inventor: Wesley John Boudville, Perth (AU)

(73) Assignee: Wesley Boudville, Los Angeles, CA (US)

( * ) Notice: Subject to any disclaimer, the term of this patent is extended or adjusted under 35 U.S.C. 154(b) by 0 days.

(21) Appl. No.: 13/136,232

(22) Filed: Jul. 28, 2011

(51) Int. Cl.
*G06F 17/00* (2006.01)
*G06K 7/10* (2006.01)

(52) U.S. Cl. ............... 235/375; 235/462.01; 235/462.11

(58) Field of Classification Search .................. 235/375, 235/462.01, 462.05, 462.09–462.11, 462.41
See application file for complete search history.

(56) References Cited

U.S. PATENT DOCUMENTS

| | | | |
|---|---|---|---|
| 6,115,508 A | 9/2000 | Lopresti et al. | |
| 6,631,012 B2 | 10/2003 | Athens et al. | |
| 7,478,746 B2 | 1/2009 | Cattrone | |
| 7,575,168 B2 * | 8/2009 | Suomela et al. | 235/462.01 |
| 7,604,172 B2 * | 10/2009 | Onogi | 235/454 |
| 7,693,744 B2 | 4/2010 | Forbes | |
| 7,918,397 B2 * | 4/2011 | Hussey | 235/462.11 |
| 8,038,054 B2 * | 10/2011 | Douma | 235/375 |
| 8,196,832 B2 * | 6/2012 | Soule et al. | 235/462.01 |
| 2001/0051915 A1 | 12/2001 | Ueno et al. | |
| 2006/0054695 A1 * | 3/2006 | Owada | 235/440 |
| 2006/0196950 A1 * | 9/2006 | Kiliccote | 235/494 |
| 2007/0125861 A1 | 6/2007 | Shoobridge | |
| 2009/0020609 A1 | 1/2009 | Cohen et al. | |
| 2010/0078482 A1 | 4/2010 | Bradford | |
| 2011/0000958 A1 * | 1/2011 | Herzig | 235/375 |
| 2012/0067943 A1 * | 3/2012 | Saunders et al. | 235/375 |
| 2012/0151293 A1 * | 6/2012 | Beals | 714/755 |

* cited by examiner

*Primary Examiner* — Michael G Lee
*Assistant Examiner* — Suezu Ellis

(57) ABSTRACT

An electronic screen capable of showing dynamic images is used to display a set of barcodes, where the barcodes are 'played' at the same location on the screen. The screen might also show other material. The data encoded in the barcodes is decoded by a user with a cellphone and camera, that can decode each barcode and combine the data from all the barcodes. This can be extended with the screen also showing static barcodes that encode URLs, where the URLs go back to a web server that also controls the screen. A user with a cellphone and camera scans one of these static barcodes and uses a browser to go to the decoded URL. The web server uses this visit to change what is being shown in the dynamic barcodes, or to change the conditions under which the latter are displayed.

8 Claims, 1 Drawing Sheet

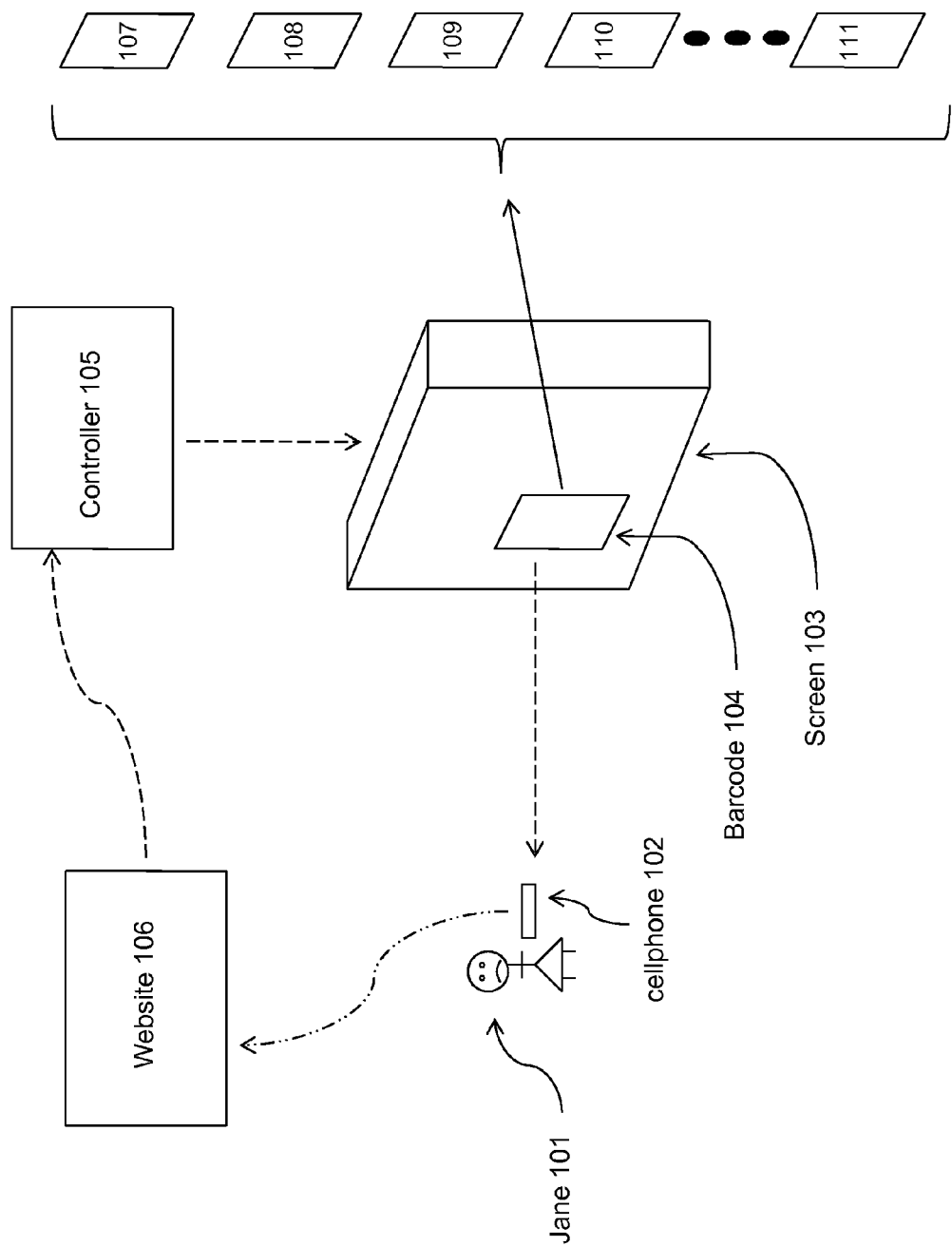

USING DYNAMIC BARCODES TO SEND DATA TO A CELLPHONE

TECHNICAL FIELD

The invention relates to the use of a cellphone to extract data from an electronic display.

BACKGROUND

One and two dimensional barcodes are now in common use. The two dimensional barcode in particular has seen popular deployment in signs posted at various locations. A common encoding is the use of the QR code, but others include the Data Matrix.

Typically, the 2d barcode encodes a URL. A common usage is for a user with a cellphone that has a camera to take a picture of the 2d barcode. Software on the cellphone decodes this to the URL. If the cellphone has (wireless) Internet access, it then goes out on the Internet to that address and downloads the webpage and displays it on the cellphone, in a browser. Whereby the user can interact with it as a standard webpage.

A barcode is preferred over the display of the URL in human readable text, because the latter needs the mobile user to read it and type it into her cellphone browser. The small size of the cellphone screen and the awkwardness of typing letters on the cellphone make the input of the URL error prone.

Hitherto, it appears that from the granted patents and patents pending, as well as general knowledge of the state of the art, that such displays of 2d barcodes are usually in permanent form. For example, printed on a poster or piece of paper.

SUMMARY

An electronic screen capable of showing dynamic images is used to display a set of barcodes, where the barcodes are 'played' at the same location on the screen. The screen might also show other material. The data encoded in the barcodes is decoded by a user with a cellphone and camera, that can decode each barcode and combine the data from all the barcodes.

This can be extended with the screen also showing static barcodes that encode URLs, where the URLs go back to a web server that also controls the screen. A user with a cellphone and camera scans one of these static barcodes and uses a browser to go to the decoded URL. The web server uses this visit to change what is being shown in the dynamic barcodes, or to change the conditions under which the latter are displayed.

BRIEF DESCRIPTION OF THE DRAWINGS

FIG. 1 shows Jane using her cellphone to read the screen display that contains dynamic barcodes.

DETAILED DESCRIPTION OF THE PREFERRED EMBODIMENT

What we claim as new and desire to secure by letters patent is set forth in the following claims.

Let Jane be a user with a mobile electronic device that has a camera that can record video. Without loss of generality, we take it to be a cellphone. This includes the case of a smartphone. But other possibilities for the device are an electronic book reader, tablet, netbook or laptop, if these devices also contain a camera that can record video. Two other cases are where the device is a digital camera that can record video, or a digital video recorder.

FIG. 1 shows Jane 101 using her cellphone 102. She is near Screen 103. This is an electronic screen that shows dynamic images. This includes 2 cases. The first is where video is shown. The second is where a series of still images is shown. In the context of this invention, both cases are equivalent. To simplify the following description, we shall consider Screen 103 to be showing video, on the understanding that this includes the other case.

Screen 103 can be an active or passive display. Active means that it illuminates its image, so that the latter can be seen without an external light source. Light comes from the image. Passive means that the image elements absorb and reflect incident light from an external source to form an image seen by Jane.

Screen 103 shows some video, where this is assumed to include Barcode 104. This is typically a 2 dimensional barcode. Often, the rest of the video can be something of semantic meaning to Jane. (Though a degenerate case is where the video only consists of Barcode 104.) The meaning induces her to point the camera of the cellphone at Barcode 104 and take a video recording.

One instance of Screen 103 might be the screen of a television. The video being shown could be that of a normal television channel that is being broadcast in the usual wireless manner. Or it could be of a cable television channel, that is connected to the television in a wired manner.

We will refer to Screen 103 as the transmitter and cellphone 102 as the receiver.

In this section of the invention, the Website 106 and controller 105 should be ignored. [These will be used later.]

Suppose for the moment that the barcode is static, even if the rest of the video varies over time. The current state of the art is where Jane's recorder has software installed that can isolate the barcode in the image, and decode it. In general, the barcode can encode arbitrary data. In practice, in the current deployment of static 2d barcodes, the data encoded is usually a URL. An installed application on Jane's device will decode this URL and then open a browser at that URL. [Assuming that the device has wireless Internet access.]

In this invention, the type of data encoded can be arbitrary. It is not restricted to the de facto case of a URL. But while the type of data is arbitrary, any given encoding has a finite capacity to the amount of data that can be encoded in a single barcode.

In general, if we choose an encoding, like QR, the capacity can be increased, by having smaller regions [usually rectangles] of different colours. But for any given encoding, there is usually defined a maximum capacity.

The resolution of the screen might also affect the maximum capacity image that can be shown.

On the recorder, its angular resolution defines the smallest solid angle that can be subtended by an encoding image. So depending on Jane's distance from the screen, the recorder might or might not be able to decode the maximum capacity encoded image that the screen can produce. Hence for a given recorder and transmitter and a given encoding, there is a maximum amount of data that can be decoded successfully by the recorder from a single barcode.

One way around this constraint is to use the dynamic ability of the screen to show different encoded data over time. This is the essence of this invention.

There are 2 core novel aspects.

The first is on the transmitter screen. It now shows a series of images of different barcodes (107, 108, 109, 110, 111).

Where we assume a given choice of barcode encoding. The preferred implementation is where the barcode images appear at the same position in the screen, and where the barcodes are all the same size. While this is not strictly necessary, it can simplify the amount of processing that the recorder has to do to isolate and analyse each barcode.

Also, as a practical matter, if Jane points her recorder's camera at a subset of the screen, where the first barcode appears, then when subsequent barcodes appear in the same location, she does not have to move the camera.

The second novel aspect is on the recorder. Currently when the device is a cellphone, Jane points its camera at a static image and then presses a button which triggers the decoding of a barcode in that image. The novel modification is now when she presses the button, the camera records the video and decodes the different barcodes and combines these into a single data set. Since software exists that can decode a single image of a barcode, this modification is a straightforward extension of that software. Below, we discuss some of the implications of how this is done.

One case is where the video is recorded for some duration, and then recording is stopped, and decoding is commenced on the different barcode images. This can be considered a batch processing approach.

Another case is where as the video is recorded in one thread, another thread or threads runs to decode the completed images in the video. This can be considered a streaming mode of processing. When the images have been decoded, they might be deleted, which frees up space and lets the recorder potentially hold more decoded data than the previous case. The cost of this might be in the extra computational power and battery power consumption needed for the concurrent threads.

Note that the data flow goes from the transmitter to the receiver. The receiver is not assumed to have a transmitter subdevice that can directly communicate with the original transmitter.

Several issues arise because of the dynamic nature of the barcodes.

a. Start and Stop Symbols

Suppose the transmitter is repeatedly playing a finite, ordered set of barcodes. The recorder needs to know when this sequence starts and ends. One method is for special start and stop symbols to be defined. These symbols should be distinct from all possible images produced in that given encoding. The symbols might be defined by some public process that is separate from the official standard for that encoding. Or the symbols might be approved by whatever entity owns, maintains or defines that encoding standard.

In general, the start and stop symbols should have the same sizes as the barcodes. The sequence starts with the start symbol (107), followed by the barcodes, and ends with the stop symbol (111). Also, the preferred implementation is where the start and stop symbols appear at the same place on the screen as the barcodes, so that Jane does not have to shift the orientation of the camera.

The recorder has an extension to the standard software, where the latter decodes the normal encoding, so that the start and stop symbols can now be detected.

The information content in these 2 symbols will be typically much less than in a barcode. In one limit, the start and stop symbols are only 1 bit of information each.

An extension is where the start symbol also encodes information about the incoming data stream of barcodes. Perhaps the number of barcodes, or the frame rate of number of barcode images per second. But even in the case of extensions like these, it can be seen that the information content of the start symbol can be expected to be relatively small, compared to a typical barcode.

Thus, given the small information content of the start and stop symbols, whatever choice of symbols is made, the detection and decoding of these by the recorder can be expected to be computationally simpler than of each barcode.

Note that if the start symbol can contain information about the barcode stream, and if this information is needed during the recording of that stream, then the start symbol should be decoded before the first barcode is recorded. An example of this arises in the next point.

b. Repeated Barcode

Another issue is the possibility of a repeated barcode. Each barcode has to appear on the transmitter screen for a minimum amount of time, to let a recorder have enough time to at capture the image, and perhaps also to decode it. Call this time x. Different transmitters might have different values of x. How does the recorder know x?

One answer is that the start symbol encodes the amount of time a single barcode will appear. Then if the recorder sees that a given barcode appears for twice this time, say, it knows that this means the decoded data correctly appears twice.

It might be objected that instead of the start symbol defining the duration of a single barcode, how about just having the recorder deduce this from the incoming barcodes? One problem is that if streaming decoding is done, and the first barcode appears 3 times, say, then the recorder does not know what is the duration of a single barcode. This complicates the overall decoding.

An alternative to having the start symbol encode the barcode duration is to define a white space symbol (110). Like the start and stop symbols, this would be of the same dimensions as a barcode, but as an image it would be different from any possible barcode. So imagine that we have a initial barcode stream of "A B C C D E", where {A, B, C, D, E} are barcodes, all different from each other, and C is repeated. Let W be the white space symbol. Then the transmitter would display in this order—"A B C W C D E".

In turn, an alternative to the previous paragraph is a simple run length encoding. Instead of W, imagine a repeat symbol R which contains a parameter indicating the number of times the next symbol, which is assumed to be a barcode, is repeated. Then the previous example of the transmitter would output "A B R(2) C D E", where the notation R(2) means that the R symbol has a 2 encoded in it.

For the white space and repeat symbols, the preferred implementation has these located at the positions of the barcodes.

c. Encoding Inside Special Symbols

Above, we described the case where the start and repeat symbols encoded parameters. What encoding method should be used? One case is where the method is an extension of that used for the barcodes. Where now extra graphics are added to these special symbols so that they cannot be confused with the barcodes.

Another case is to devise a new encoding method, perhaps simpler than that used for barcodes, because the amount of data to be encoded is expected to be far less.

d. Data Encoded

Suppose the data encoded in the barcodes is ascii or unicode. In turn, there could be an internal format to this data, where the format has been publicised so that the recorder's software understands and uses it.

For example, the simplest case could be where the data is written in a variable=value format, where these pairs are delimited by, say, a semicolon. Or perhaps the data is written in XML. The latter might be circumspect because even though the use of multiple barcodes gets around the data limitation in a single barcode, XML can still be verbose, and this might be considered excessive in the context of this application.

e. Dynamic Data

Above, we discussed the case where a fixed set of barcodes is repeatedly shown on the transmitter screen, bracketed by start and stop symbols. So the original data is constant. Another possibility is where the barcodes contain dynamic data, being shown in near real time. Note the difference between the dynamic barcodes and dynamic data.

For example, suppose the transmitter is connected to a set of sensors that measure parameters about the surroundings, like temperature, pressure, humidity and rainfall. Then the current values of these are output in a given set of barcodes. The next set of barcodes will then have newer readings.

This also leads into examining an instance of why this invention might be implemented. One case could be transducers or sensors that have data about the surroundings. These could have a display that shows the data or subsets of it in human readable format. For example, "Temperature=35 Celcius, High=40, Humidity=80% [etc]".

Jane can read this for herself. But suppose she has some application on her device that can use this information. Even typing the limited amount of data in the above example can be error prone on her device, especially if it has a small form factor, like a cellphone. And of course the use of multiple barcodes lets her easily download a relatively large amount of data.

Why can't the transmitter just use a wireless method like WiFi or Bluetooth? It might also do that. But suppose that the transmitter has a screen, that perhaps is primarily for humans to view. Then the incremental cost in software and memory to implement the transmitter side of this invention is relatively small. No extra hardware needed.

This is especially germane if there are a lot of transmitter screens already deployed, without the means to also broadcast in some other wireless manner. Like conventional televisions or electronic billboards or screens.

Hence the prior existence of the transmitter screen for human viewing can be a key reason for using this invention. Likewise at the user level, the only main assumption is that the recorder have a camera. The invention piggybacks on existing hardware.

Another reason is to allow a second channel or modality for Jane to get the data, assuming that the transmitter is also broadcasting it by other means. In case Jane's device is not able to receive by those means.

Also, in contrast to a wireless communication method that is not line of sight, the current invention minimises the chances of spoofing, where a false transmitter pretends to be the correct wireless transmitter. The line of sight nature of this invention means that Jane can be assured that she is getting data directly from the screen.

One possible usage is where Jane is at an Automated Teller Machine (ATM) or some other type of kiosk with a computer screen. Suppose she has a cellphone that can implement the receiver side of this invention, and there is a button on the ATM that she can press to indicate this to the machine. The ATM screen then might commence displaying some dynamic barcodes. Prior to this, the ATM could have a holder near the screen, into which Jane places the cellphone. The holder aligns the cellphone so that its camera can focus on the barcodes. The holder might be designed to hold most common types of cellphones. Optionally, Jane might have to adjust the holder to best align the cellphone vis a vis the screen. Or the holder/ATM might have electronics that can do this, perhaps based on detecting the model of cellphone and thus having knowledge of the placement of the phone's camera.

The close distance between the cellphone and the screen means that a relatively high resolution encoding might be used, which increases the download bandwidth.

Currently with most ATMs, any data transfer is from the customer to the machine, via the pressing of buttons. This invention lets the ATM send considerable data in the other direction. Perhaps this data is specific to the customer, like her stock portfolio; hence the desire for privacy against evesdropping. There is utility in Jane getting this information in electronic form on her cellphone, rather than say as paper printout from the ATM. It can be cheaper for the bank. Also, having it electronically can be more convenient than a lot of bulky hardcopy. And the data might be in a format that can be used by other software packages, like a spreadsheet. Analogous to how film cameras have been superseded by digital cameras.

Of course, there could be other means to download data. Including Bluetooth or Near Field Communication. The method of this invention should not be seen as an exclusive means, but perhaps as a fallback if the cellphone cannot use other means.

There could be specific implementations of this invention's transmitter where Jane might be able to manually affect the transmitter's operation. For example, the transmitter's screen might be turned off or in a low power mode, and Jane can go to it and press a button to activate it, whereupon the screen displays the barcodes and perhaps some other information to be viewed manually.

f. User Feedback Changing Transmitter Screen

In a co-pending application Ser. No. 13/068,782, we discussed how the user could use a cellphone with a camera, view a barcode (that encodes a URL) on an electronic screen, and where by the phone going to that URL, a signal goes to the server that controls the screen. The server then causes a different image or video to appear on the screen. The server is a dual server, for it responds to general queries from the Internet, and it controls ('serves') the screen. In that provisional, a bar code was considered static, even if it appeared in a video where other parts of the screen varied in time.

In FIG. 1, this is shown as the objects Website 106 and Controller 105. The server for the URL can be envisaged as Website 106, and Controller 105 can be considered as the computer that directly controls Screen 103. Website 106 sends data and instructions to Controller 106 via some type of wired or wireless connection.

By combining that provisional with this invention, we have the following.

One implementation is for the transmitter to show several static barcodes, each encoding a URL. Assume that all the URLs go to the same server, but that the arguments in the URL indicate which has been picked by Jane. From a given choice, the server displays on the screen a set of dynamic barcodes, as described earlier in this invention. Where each set corresponds to a given static barcode.

The location of the dynamic barcodes might be different from any of those static barcodes. Or it might be at the location of the picked static barcode. This makes it easier for Jane, as she has already moved her camera to focus on the latter barcode. So simply holding the camera steady means that she can then download the new data.

Another implementation is where one or more of the static barcodes can affect the resolution settings on the dynamic barcodes. Imagine perhaps that Jane's camera is having trouble decoding the latter because the resolution is too fine for the combination of her camera and the distance to the screen and the resolving power of the screen. Hence there might be 2 static barcodes; one that implements 'lower resolution' and one that implements 'higher resolution'. These barcodes would appear on the screen while the dynamic barcodes are shown elsewhere on the screen. By picking the 'lower' barcode, Jane triggers a redisplay of the dynamic barcodes. Or she might pick 'higher' if her camera can read the smaller details.

A variant is where there is a set of static barcodes, each corresponding to a given resolution.

In general, having both static and dynamic barcodes on the screen lets the server offer arbitrarily complex choices to the user about the type of data and how it is shown in the latter barcodes.

Another implementation is where the data decoded from the dynamic barcodes contains one or more URLs that go back to the server. The cellphone could have software that displays these in a browser or other application, where Jane could click on one of these. It could tell the server various things, including changing the transmitter screen to show other video or to offer other data to download via barcodes. This use of embedded URLs to close a feedback loop to the transmitter could be instead of or in addition to the use of static barcodes on the screen.

A variant on the previous paragraph is where Jane does not have to click on a decoded URL. Instead, the data is automatically decoded and sent to an application that uses it to perform some computations. One result could be that the application opens a connection on the Internet to a decoded URL. Which could then cause the server to send more data via the barcodes. Hence there is an automated feedback. An instance of a machine to machine [M2M] interaction.

In the previous 2 paragraphs, the use of a URL inside the downloaded data offers potentially more customised feedback to the server than via static barcodes. The 'internal' URL could be picked out of many in the data. More than the number of static barcodes on the screen, since the size of the screen and the probable need to have space on the screen to show other video limits this. Also, an internal URL could be constructed not just using a URL in the downloaded data, but also with extra arguments, where these are computed by the cellphone application, based on the data and on Jane's preferences and on any other parameters on the phone accessible to the application. So an internal URL can be more flexible than a static URL from a static barcode.

g. Other Extensions

Thus far, we referred to the receiver as typically being a device like a cellphone, where Jane manually points its camera at the portion of the transmitter screen that has the barcodes, dynamic or static. Another possibility is for the receiver to be an automated device, with image recognition software that recognises the presence of barcodes in a possibly low resolution image. The receiver can then focus its camera directly on those barcodes.

If the receiver is moving, it could have an electromechanical apparatus that automatically keeps the focus on the barcodes as much as possible, i.e. autotracking and image stabilisation.

Another extension refers to the earlier description of how a choice of a static barcode can determine what is shown in the dynamic barcodes. It was assumed that there was only one user doing this near the transmitter. This can be generalised to several users in the vicinity, each with a receiver device that can also access the Internet. Different users might choose different static barcodes. The transmitter could tally these up over some time interval, and use voting to determine which choice or choices it will implement in the encoding of a future set of dynamic barcodes.

Similarly, the users might choices from various URLs inside the data decoded from the dynamic barcodes, where these choices go back to the transmitter. Which can tally these up and use voting to determine a future set of dynamic barcodes.

The ideas of the previous 2 paragraphs can be combined, so that users make choices from static barcodes and from URLs inside the data decoded from the dynamic barcodes. The transmitter tallies these to determine a future set of dynamic barcodes.

REFERENCES

[1] "Clock free two-dimensional barcode and method for printing and reading the same" by D. Lopresti et al, U.S. Pat. No. 6,115,508 (2000).
[2] "Apparatus and method for printing two-dimensional barcode and articles incorporating such barcode" by G. Athens et al, U.S. Pat. No. 6,631,012 (2003).
[3] "Two-dimensional color barcode and method of generating and decoding the same" by P. Cattrone, U.S. Pat. No. 7,478,746 (2009).
[4] "Optimised messages containing barcode information for mobile receiving device" by R. Forbes, U.S. Pat. No. 7,693,744 (2010).
[5] "Data transfer system using mobile terminal and two-dimensional barcode" by T. Ueno et al, US Patent application 20010051915 (2001).
[6] "Three dimensional barcode" by R. Shoobridge, US Patent application 20070125861 (2007).
[7] "Sensor-embedded barcodes" by Marc Cohen et al, US Patent application 20090020609 (2009).
[8] "Dynamic barcode system" by G. Bradford, US Patent application 20100078482 (2010).
[9] "Cellphone changing an electronic display that contains a barcode" by W. Boudville, U.S. patent application Ser. No. 13/068,782 (2011).

I claim:
1. A system, comprising:
a screen adapted to show a video;
a controller for controlling the video shown on the screen, the video comprising a series of dynamic barcodes and static barcodes at a same screen location over a period of time;
an image frame comprising a non-barcode imagery elsewhere in the frame, when the image frame comprises one or more dynamic barcodes of the series of dynamic barcodes;
data encoded within the one or more dynamic barcodes, wherein the data is divided into a sequence of parts,
wherein the series of dynamic barcodes is optionally prefaced by a starting image, the starting image being different from any of the one or more dynamic barcodes, and the series of dynamic barcodes is optionally terminated by an ending image, the ending image being different from any of the one or more dynamic barcodes,
wherein two sequential dynamic barcodes optionally comprise a spacer image inserted between the two sequential dynamic barcodes, the two sequential dynamic barcodes also being two identical dynamic barcodes, and different from any of the one or more dynamic barcodes, wherein the series of dynamic barcodes comprises at least two sequential dynamic barcodes, wherein two or more of the sequential dynamic barcodes are optionally replaced by a repeater image and a single instance of the one or more dynamic barcodes, and wherein the repeater image differs from an image of any of the one or more dynamic barcodes and the repeater image encodes a number of repetitions of a particular dynamic barcode of the one or more dynamic barcodes; and a mobile device with a camera and software adapted to record and decode the encoded data from the one or more dynamic barcodes and the static barcodes, and reassemble the decoded data into a copy of the data encoded, wherein the screen shows the static barcodes, wherein the static barcodes comprise encoded Universal Resource Locators (URLs) pointing to a web server, the web server being adapted to control the controller, wherein the mobile device is used to scan the static barcodes and access the encoded URL on the Internet, and wherein the web server uses URL from the scanned static barcodes to determine the data to be encoded in the one or more dynamic barcodes, or to specify conditions under which the one or more dynamic barcodes are made or shown, or to stop the playing of a current set of the series of dynamic barcodes.

2. The system of claim 1, wherein a choice of the static barcodes causes the one or more dynamic barcodes to be of a lower or higher resolution, relative to the current resolution.

3. The system of claim 1, wherein the static barcodes correspond to a given resolution.

4. The system of claim 1, wherein a plurality of mobile devices are used to scan a plurality of static barcodes, wherein the web server tallies the encoded URL within the scanned static barcodes over a set time interval to decide which encoded URL to implement in determining content or display parameters of a future set of one or more dynamic barcodes.

5. The system of claim 1, wherein the mobile device comprises an application adapted to analyse a reassembled decoded data and accesses one or more URLs.

6. The system of claim 5, wherein the mobile device provides feedback to the web server to determine information to send or not send in a next set of one or more dynamic barcodes.

7. The system of claim 6, wherein a plurality of mobile devices are used to pick various URLs inside the data decoded from the one or more dynamic barcodes, wherein the web server tallies the data over a set time interval to decide which URL to implement in determining content or display parameters of a future set of one or more dynamic barcodes.

8. The system of claim 7, wherein the web server uses the encoded URLs from different static barcodes to determine a future set of one or more dynamic barcodes.

* * * * *